Sept. 23, 1924.　　　　　　　　　　　　　　　　　　1,509,327
J. F. WINCHESTER
APPARATUS FOR AND METHOD OF CLEANSING UNITS OF MOTOR VEHICLES
Filed Oct. 25, 1922　　　2 Sheets-Sheet 1
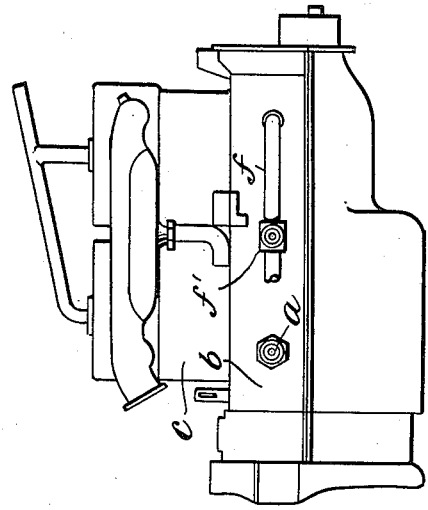
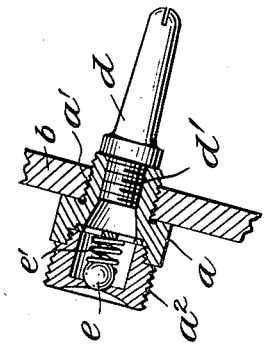
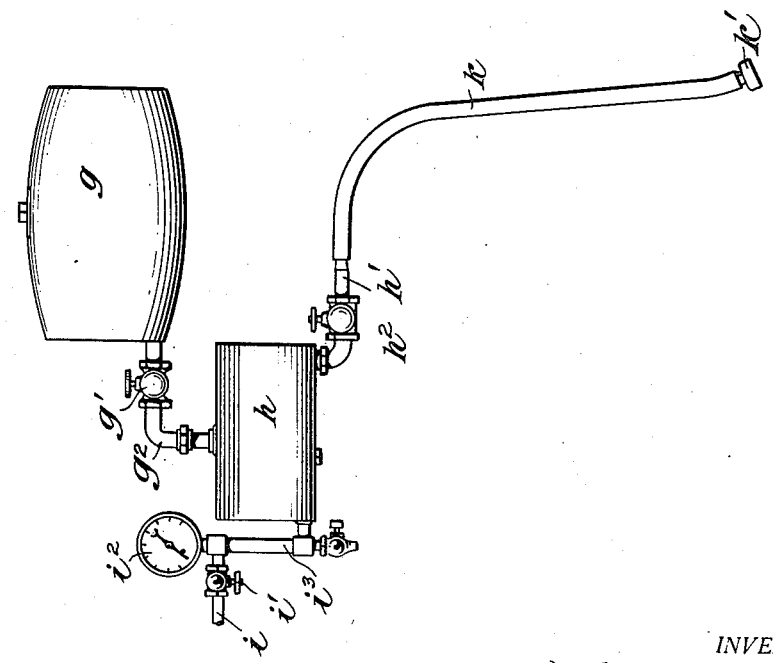
INVENTOR
BY
ATTORNEYS Sept. 23, 1924. 1,509,327
J. F. WINCHESTER
APPARATUS FOR AND METHOD OF CLEANSING UNITS OF MOTOR VEHICLES
Filed Oct. 25, 1922 2 Sheets-Sheet 2
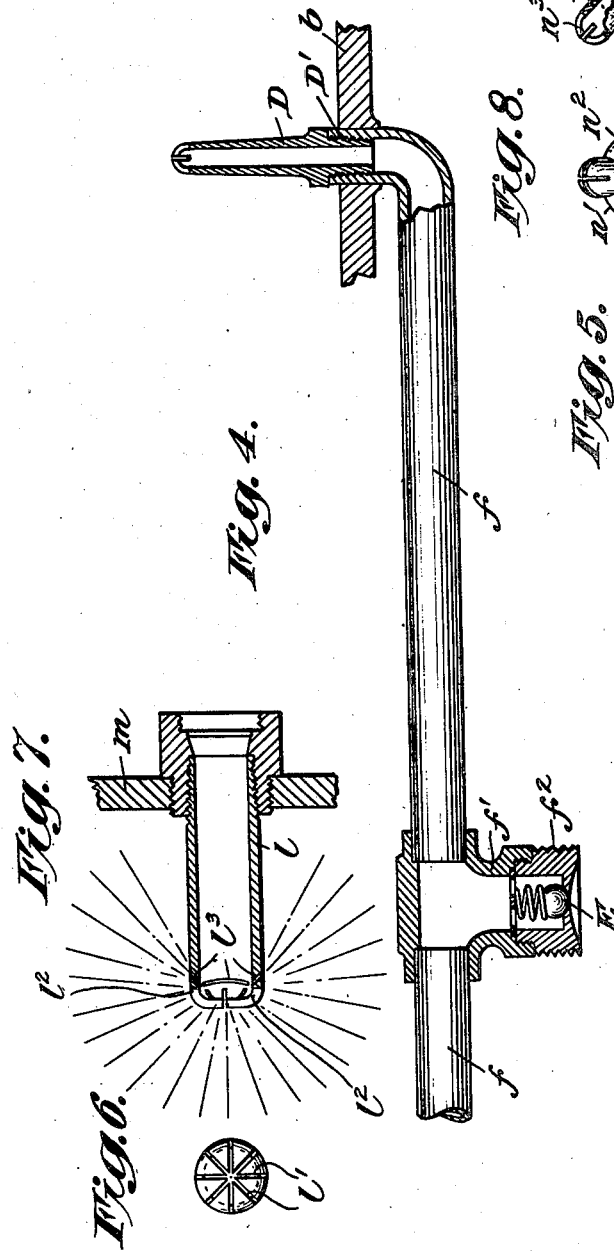
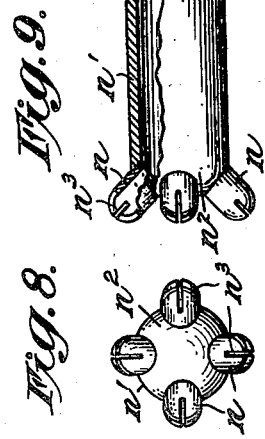
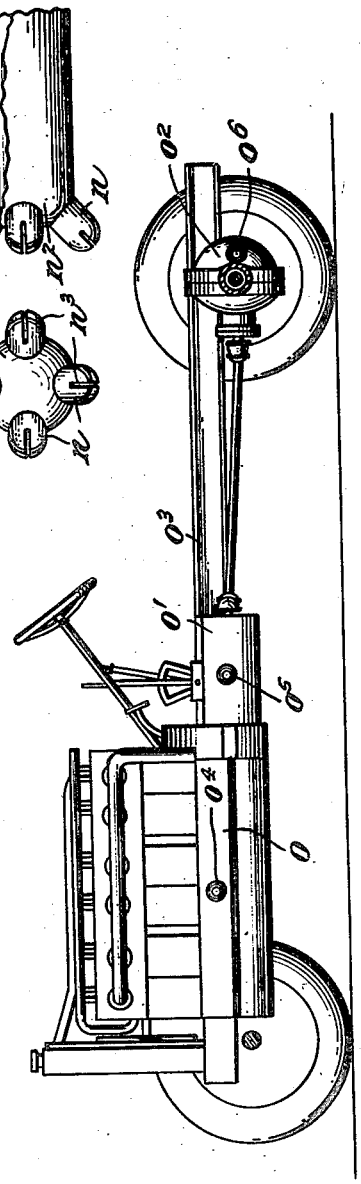
INVENTOR
John F. Winchester
BY
ATTORNEYS Patented Sept. 23, 1924.

1,509,327

UNITED STATES PATENT OFFICE.

JOHN F. WINCHESTER, OF BALTIMORE, MARYLAND.

APPARATUS FOR AND METHOD OF CLEANSING UNITS OF MOTOR VEHICLES.

Application filed October 25, 1922. Serial No. 596,723.

*To all whom it may concern:*

Be it known that I, JOHN F. WINCHESTER, a citizen of the United States, residing in the city of Baltimore, in the State of Maryland, have invented certain new and useful Improvements in Apparatus for and Methods of Cleansing Units of Motor Vehicles, of which the following is a specification, reference being had to the accompanying drawings, forming a part hereof.

The proper servicing of motor vehicles has not kept apace of developments in the motor vehicle art. Vehicles in general use are ordinarily operated until repairs are required except for the introduction at irregular intervals of gasoline, water and oil. Any further care and attention may be obtained only at relatively great cost and loss of time and the results are only partially satisfactory in that no provision is made for obtaining access to the interiors of the various units except by special tools and skilled labor. Even mechanics in an ordinary floor job may secure only partial access to the interior and find it impossible to reach remote portions for proper cleansing. It is true that many users of motor vehicles have the impression that the crank case, transmission box and differential housing should be cleansed interiorly at regular intervals but it is the exception rather than the rule when any such attention is given to these parts more than once a year. It then becomes a job of some magnitude to have the cleansing done and the motor vehicle is usually left at a garage for a day or longer and the mechanic undertakes to remove the oil and grease from within the units as best he can without actual disassembly and to flush the interior by introducing a flushing oil. The means of access, however, by their very nature, prevent the use of any real flushing means and the interior of the units include so many remote corners and crevices both in their walls and in their parts as to make it impossible for a real cleansing to be approximated. In some instances, mechanics after introducing a flushing oil into a crank-case will turn the motor over for the purpose of securing some ad-agitation of the oil but this expedient is ineffective to secure a cleansing or flushing action at all points.

Crank-case oil breaks down from the heat of the motor and suffers decomposition, it is constantly subject to dilution by the heavy ends of gasoline which pass the pistons, and is "emulsified" by the water vapor condensed in the crank-case. The hard service that this oil receives is such as to make it imperative, if the motor and its parts are to be efficiently operated and protected, to change the oil and cleanse the parts every four or five hundred miles.

The oil or grease in the gear case with a conventional sliding gear transmission is broken down by mechanical agitation arising from the whirling gears, and suffers serious contamination from little chips of metal broken off by the clashing gears. Oil or grease in the condition resulting from long continued use in a gear case is not only ineffective to serve its intended purpose but carries into the bearings metal chips which may actually injure the parts. It is known that serious consequences may result from the use of oil or grease in a gear box for more than five thousand miles.

With respect to the final drive the oil or grease is broken down by heavy pressures in the gearing, metallic particles are picked up by the oil under such pressure and water works its way into the casing and thins the oil. Proper efficiency in operation can be maintained only if the oil or grease is changed every three thousand miles and the interior cleansed.

The general object of the present invention is to provide for a quick, inexpensive and effective method of cleansing the interiors of any one or more of the units of a motor vehicle in a way which shall be wholly practical in a service sense. More particularly, the invention contemplates the association with the units of a motor vehicle of means whereby a flushing medium may be readily introduced into their interiors and be directed over the whole surface to be cleansed and into the remote corners and crevices. The invention further contemplates the introduction of such a flushing medium under pressure and its discharge through nozzles which shall be so located and of such form as to direct the medium under pressure to the places and against the parts to be cleansed. More particularly, the invention contemplates the permanent incorporation into the walls of the units of a motor vehicle of one or more valve-controlled jets to which may be quickly connected a source of supply of a flushing medium under pressure. The invention further includes within its scope the provision of suitable apparatus which may be provided in a service station or garage for ready connection with the aforesaid nozzles and for the delivery thereto of a flushing medium under pressure.

In accordance with the invention the preferred embodiment will find one or more nozzles secured permanently in the walls of the crank case, gear case and differential housing of a motor vehicle, check valves being incorporated in each of these nozzles to prevent escape of any fluid within while permitting the cleansing fluid to be injected therethrough. The spray jets on the inner ends of the nozzles are of such form and disposition as to direct the flushing medium to the desired parts of the interior of the unit, in some cases more than one nozzle being employed. The apparatus for connection with the said nozzles by which the flushing medium is delivered therethrough under pressure may take many different forms but that illustrated herein will be found thoroughly practical for ordinary conditions. As shown, the reservoir for a flushing oil discharges into a tank where it is subjected to air pressure and forced therefrom through a flexible hose to the nozzle with which the hose may be quickly and detachably engaged when the car is brought in for the cleansing.

The invention in its important aspects will be better understood with reference to the illustrated embodiment shown in the accompanying drawings wherein:

Figure 1 is a view of a suitable permanent apparatus for a garage or service station, by which a flushing medium may be delivered under pressure.

Figure 2 is a conventional view in side elevation of a motor having its crank case provided with a pluralty of nozzles by which the improved method may be practised.

Figure 3 is a detail view partly in section and partly in elevation of a suitable form of nozzle and showing a check valve associated therewith.

Figure 4 is a view partly in plan and partly in horizontal section of a pipe connection suitable for use in connection with a crank case where two nozzles are employed as indicated in Figure 2.

Figure 5 is a schematic view in side elevation of a motor vehicle chassis, the wheels and frame member at one side being omitted, and in which the crank case, gear case and differential housing are provided with nozzles for practicing the improved method.

Figures 6 and 7 show in detail another suitable type of spray jet.

Figures 8 and 9 show still another suitable type of spray jet.

It is to be understood that this invention is not to be limited to the details of construction of any of the elements employed in practicing the improved method but resides, more broadly, in the application to a motor vehicle of devices by which the interiors of one or more of the units thereof may be thoroughly and completely flushed out and cleansed without the service of a skilled mechanic, without disturbing or disassembling any of the parts, and in accordance with the accepted standards of proper servicing. So far as is known, no means for accomplishing such results have ever before been proposed and the results cannot be accomplished in the absence of provision for a quick, simple and inexpensive method insuring complete access to the interiors of the units to be cleansed. The drawings illustrate, somewhat diagrammatically, suitable means for practicing the improved method and emphasize certain characteristics of the types of spray jets which are best adapted for insuring complete penetration of the flushing medium into the remote portions of the interiors. The invention is not to be limited to the number of jets employed with respect to any of the units nor to their precise disposition in the wall thereof since such factors will be determined by one skilled in the art with reference to the size and shape of each unit. As shown in Figure 2, for instance, a single nozzle $a$ may be carried in the wall $b$ of the crank case of the motor $c$ and preferably at the right side thereof to conform with the circulatory path taken by the oil within the case. A suitable type of nozzle is shown in section at Figure 3. Its base may be either permanently or removably supported in the wall $b$ of the crank case as by threading it in, threads $a'$ being shown, or by casting it in the wall directly in the mold. The spray jet $d$ proper may be either integral with the body of the nozzle or separate therefrom and threaded into the body as indicated at $d'$ in the drawings. A check valve is incorporated in the nozzle to prevent the escape of fluids within the units such a check valve being illustrated as a ball $e$ pressed to its seat by a spring $e'$ in a manner which will be understood. The nozzle is preferably threaded at its outer end, as at $a^2$, or otherwise provided with coupling means whereby it may be quickly engaged with a source of supply of the flushing oil. The spray jet $d$, as will be pointed out more particularly hereinafter, is of such character and so disposed with respect to the wall $b$ and to any other parts within the crank case as to insure the discharge of the flushing medium over the entire inner surface and into remote crevices and corners to the end that the whole interior may be effectively cleansed.

In some cases, it may be deemed preferable to provide in the unit such as the crank case $b$ two or more such nozzles as are indicated in both Figures 2 and 4. In such a case, a connecting pipe $f$ may carry the desired number of nozzles D or at least communicate therewith so as to deliver the flushing medium thereto. In practice, for instance, the pipe $f$ may be cast into or otherwise secured to the wall of the crank case $b$ while the stem of the jet D is threaded into the pipe as indicated at D'. The flushing medium in such a construction is preferably introduced into the pipe $f$ or pipes $f$ through a union $f'$ which is threaded at $f^2$ for quick engagement with a source of supply and has incorporated therein a check valve E which may be of the same character as that heretofore described. The point emphasized by the illustration of more than one nozzle communicating with a common supply pipe is that the number and disposition of the jets will depend upon the factors relating to the particular unit in which introduced.

In a motor vehicle having one or more of its units equipped with nozzles adapted to introduce a flushing medium in a proper way to effect a thorough cleansing, means must also be available for co-operation with the nozzle for discharging flushing medium therethrough quickly and effectively. While such an apparatus may take different forms there has been shown in Figure 1 an installation which is suitable for permanent mounting in a garage or service station where the improved method is to be practiced. This apparatus includes a tank $g$ in which the flushing medium is stored and from which it may be led through a hand valve $g'$ and pipe $g^2$ into a reservoir $h$ where it may be subjected to the pressure of air introduced through a pipe $i$ and hand valve $i'$. A gage $i^2$ may be piped in to indicate the air pressure. From the reservoir $h$ the medium may be led through a discharge pipe $h'$ controlled by a hand valve $h^2$ to a flexible hose $k$ carrying at its end a coupling member $k'$ for engagement with the coupling means associated with the nozzle $a$ in the unit to be cleansed. In the illustrated embodiment the nozzle is threaded as at $a^2$ so that the coupling element $k'$ may be formed as a union nut for ready engagement with the threads of the nozzle.

In order to emphasize the thorough character of the cleansing operation provided for by the improved construction and method reference is to be made to Figs. 6–9 wherein are illustrated, by way of example, two other types of spray jets useful for discharging the cleansing medium most effectively throughout the surface of the interior of the units to be cleansed. As shown in Figs. 6 and 7 the jet $l$ has formed at its end diametrically extending slots $l'$ of any suitable number to discharge the medium in a circular spray. These slots as shown in Fig. 7 may be extended back into the stem of the jet as indicated at $l^2$ so that an effective discharge zone of 180° will be provided for. Such a spray, emitted under pressure will insure an effective flushing to a large degree although it will be desirable to discharge the medium through the greater part of the remaining zone of 180°. For instance, the spray should not only be thrown out into all directions within the interior of the unit but should also be discharged against the wall $m$ thereof. The jet $l$, therefore, is formed with a series of circumferential slots $l^3$ preferably inclined rearwardly with respect to the jet passage and serving to throw the cleansing medium under pressure back against the wall $m$ and substantially envelop the jet $l$ and reach all parts of the unit within the included angle. In other words, the jet $l$ provides for a spray of substantially spherical form which will reach not only the wall of the unit but every remote corner and crevice thereof and flush out all foreign particles and matter and cut accumulated material in the way desired. This cleansing operation as will be understood from the description hereinbefore may be going on simultaneously through several nozzles so located with respect to one another and the unit and the parts contained therein as to quickly reach every part of the interior and effect the cleansing at a single servicing operation.

In the type of nozzle shown in Figs. 8 and 9 small jets $n$ are formed with or carried by the stem $n'$ of the nozzle, the end $n^2$ of this stem being preferably of spherical form and having four such small jets $n$ disposed on the face of the sphere and spaced uniformly with respect to one another so as to insure, in use, four independent sprays which, collectively, will combine to form a single spray of generally spherical outline. The jet openings $n^3$ may be intersecting slots of such extent as to permit the issuance of a spray through an angle of at least 180° and the relative angular disposition of the several small jets $n$ insures the issuance of spray through angles of substantially 360° in every plane.

Having in mind the general objects of the improved method and details of suitable apparatus for practicing it reference may now be made to Figure 5 for an understanding of a practical way of realizing the greatest advantages in use. As shown, it is proposed to equip the crank case $o$, gear box $o'$ and differential housing $o^2$ of a motor vehicle $o^3$, preferably at the time of manufacture, with one or more nozzles in the walls adapted to perform the functions heretofore indicated. Such nozzles are illustrated conventionally in Figure 5 as $o^4$, $o^5$, $o^6$, in the crank case, gear box and differential housing, respectively.

They are so disposed in the side wall as to discharge a cleansing fluid on the interior of each of the unit against all surfaces to be cleansed. Check valves will be incorporated in each of the nozzles to prevent the escape of fluids from within during normal operation of the vehicle. For a servicing job consisting of the flushing of any one or more of the units the car will be run into a garage or service station where the apparatus shown in Figure 1, or its equivalent, is permanently installed for just such work. The coupling between any one of the nozzles $o^4$, $o^5$, $o^6$, and the hose $k$ may be readily effected by the attendant and pressure admitted to the reservoir $h$ which may hold a predetermined quantity of the flushing medium, sufficient for flushing the particular unit to be cleansed. A sight gage $i^3$ associated with the reservoir $h$ will indicate the desired quantity within the reservoir as admitted under control of the valve $g'$. When the valve $h^2$ is opened the cleansing medium under pressure will be forcibly emitted from the jet within the unit being cleansed and the entire contents will be flushed out, the usual pet cock on the unit being open meanwhile. The operation is wholly a clean one and may be carried on with dispatch and little expense. One unit after another may be flushed out quickly in accordance with the method without entailing any undue delay. The job is more effective than any known method of flushing and comprehensively includes all of the units on each car.

As indicated hereinbefore, the method may be practised successfully with units which differ in design from those illustrated herein but all such modifications are to be deemed within the spirit of the invention provided the results are secured in a servicing manner and, generally, in accordance with the force feed discharge of the flushing medium throughout the interior surface of the unit to be cleansed.

What I claim is:

1. In a motor vehicle, in combination with enclosed units thereof having movable operating parts therein, spray nozzles mounted in the walls thereof for discharge of a cleansing medium under pressure throughout the interiors, the form and disposition of said nozzles being such as to carry the cleansing medium effectively against relatively remote and inaccessible areas of the interiors.

2. In a motor vehicle, in combination with enclosed units thereof having movable operating parts therein, spray nozzles mounted in the walls thereof for discharge of a cleansing medium under pressure throughout the interiors, the form and disposition of said nozzles being such as to carry the cleansing medium effectively against relatively remote and inaccessible areas of the interiors, means to connect a source of supply of a cleansing medium with the outer ends of said nozzles and apparatus for delivering a flushing medium under pressure through said connection including a reservoir for the flushing medium and a pressure line communicating with said reservoir to force the medium therefrom.

3. In a motor vehicle, in combination with enclosed units thereof having rotating parts therein, spray nozzles mounted in the walls of the units for discharge of a cleansing medium under pressure into the interiors, said nozzles being of such form and disposition as to discharge into both the upper and lower parts of the units and against relatively remote and inaccessible areas of the walls and rotating parts.

4. The herein described method of flushing the interior of an enclosed unit of a motor vehicle consisting in the insertion in the wall of the unit of a spray jet for a cleansing medium, the connection therewith of a source of supply of a cleansing medium under pressure and the discharge through the jet under force feed of such cleansing medium to relatively remote and inaccessible areas of the enclosed unit.

5. A spray nozzle for flushing the interior of a motor vehicle unit having a jet at its inner end adapted to discharge the medium in a substantially spherical spray, coupling means at its outer end for engagement with a source of supply of a flushing medium and a check valve to prevent escape of fluid from within the unit.

This specification signed this 20th day of October, A. D. 1922.

JOHN F. WINCHESTER.